US012724249B1

(12) United States Patent
Alakarhu

(10) Patent No.: US 12,724,249 B1
(45) Date of Patent: Sep. 1, 2026

(54) AUTOMATIC LICENSE PLATE RECOGNITION USING ASYMMETRIC CAMERA LENS

(71) Applicant: Axon Enterprise, Inc., Scottsdale, AZ (US)

(72) Inventor: Juha Alakarhu, Helsinki (FI)

(73) Assignee: AXON ENTERPRISE, INC., Scottsdale, AZ (US)

( * ) Notice: Subject to any disclaimer, the term of this patent is extended or adjusted under 35 U.S.C. 154(b) by 0 days.

(21) Appl. No.: 18/088,199

(22) Filed: Dec. 23, 2022

Related U.S. Application Data

(60) Provisional application No. 63/293,525, filed on Dec. 23, 2021.

(51) Int. Cl.

| | |
|---|---|
| ***G02B 13/18*** | (2006.01) |
| ***G06V 10/147*** | (2022.01) |
| ***G06V 20/62*** | (2022.01) |
| ***H04N 23/55*** | (2023.01) |
| ***H04N 23/67*** | (2023.01) |

(52) U.S. Cl.
CPC ........... *G02B 13/18* (2013.01); *G06V 10/147* (2022.01); *G06V 20/625* (2022.01); *H04N 23/55* (2023.01); *H04N 23/675* (2023.01)

(58) Field of Classification Search
CPC .... G02B 13/18; G06V 10/147; G06V 20/625; H04N 23/55; H04N 23/675
See application file for complete search history.

(56) References Cited

U.S. PATENT DOCUMENTS

| | | | | |
|---|---|---|---|---|
| 5,757,423 | A * | 5/1998 | Tanaka | H04N 25/133 348/335 |
| 2008/0055412 | A1 | 3/2008 | Tanaka | |
| 2009/0179143 | A1* | 7/2009 | Murooka | G02B 27/281 250/225 |
| 2011/0216197 | A1 | 9/2011 | Mulin et al. | |
| 2014/0232928 | A1* | 8/2014 | Ono | G02B 3/10 348/349 |
| 2014/0267825 | A1* | 9/2014 | Ono | H04N 23/56 348/222.1 |
| 2015/0156478 | A1* | 6/2015 | Ono | G02B 3/0043 348/49 |
| 2019/0004531 | A1 | 1/2019 | Viala et al. | |
| 2020/0005050 | A1* | 1/2020 | Higuchi | G06V 20/56 |
| 2020/0324713 | A1* | 10/2020 | Lee | B60R 11/04 |

FOREIGN PATENT DOCUMENTS

| | | | | |
|---|---|---|---|---|
| WO | WO-2006137355 | A1 * | 12/2006 | G02B 3/08 |

* cited by examiner

*Primary Examiner* — Michael Lee
(74) *Attorney, Agent, or Firm* — H S. Malvich, Jr.; Carmel Zhao

(57) ABSTRACT

Cameras for automatic license plate recognition ("ALPR") systems comprise an asymmetric lens for focusing light received by the camera. The asymmetric lens may comprise a curvature configured to modify one or more focus areas of the field of view, such that one or more regions of a scene captured by the ALPR system are optimized to focus at a distance corresponding to an expected object of interest in the respective region. The asymmetric lens may additionally or instead comprise a tilt configured to emphasize a first focus area and de-emphasize a second focus area of the field of view.

20 Claims, 5 Drawing Sheets

AUTOMATIC LICENSE PLATE RECOGNITION USING ASYMMETRIC CAMERA LENS

FIELD OF THE INVENTION

Embodiments of the present invention relate to an automatic license plate recognition ("ALPR") system. Specifically, embodiments relate to an asymmetric optical element that provides at least one focus area to improve image data in which one or more license plates are captured.

BRIEF DESCRIPTION OF THE SEVERAL VIEWS OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
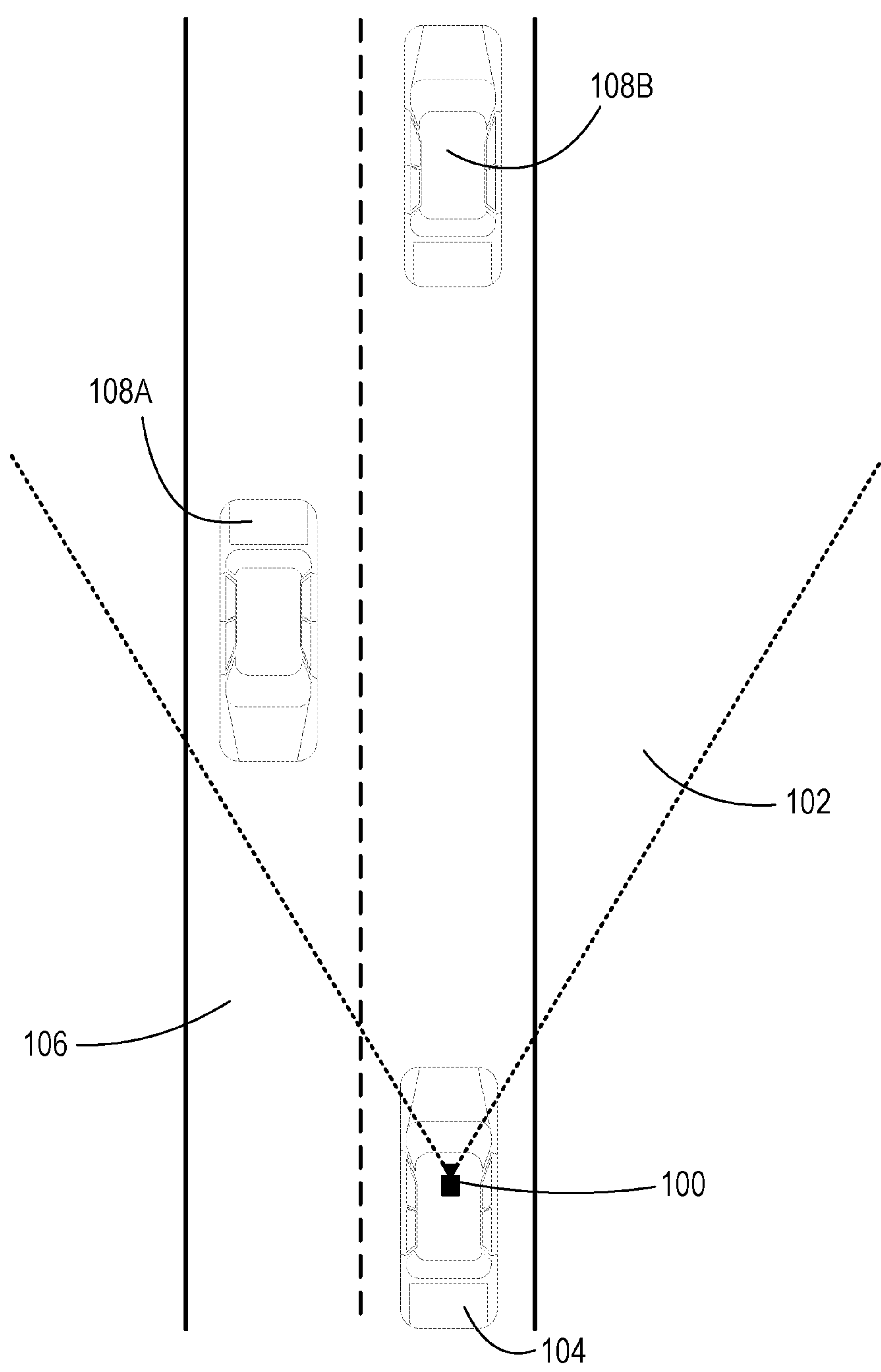
FIG. 1 shows an illustrative roadway on which subject vehicles and target vehicles may be traveling while the subject vehicle is operating in accordance with one or more example embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Generally, systems and methods are disclosed for capturing license plate information of a vehicle relative to a camera. In one example, a camera for an automatic license plate reading (ALPR) system comprises an aperture for receiving light from a field of view of the camera, an asymmetric lens for focusing light comprising a curvature, and an image sensor for detecting image data of the field of view in response to the focused light. The curvature of the asymmetric lens is configured to define one or more focus areas relative to a field of view of the camera, such that responsive to the camera receiving light from the field of view, the asymmetric lens focuses the light in accordance with the one or more focus areas. Focus areas of the asymmetric lens are configured to capture objects in focus within the focus area, e.g., having an associated focus distance representative of an expected location of an object in the field of view. In some examples, focus areas of the asymmetric lens are fixed based at least in part on expected locations of license plate information relative to a camera mounted to subject vehicle.

By way of example, and in no way limiting the features and contemplated combination of features disclosed herein, illustrative use cases are described below describing particular aspects of disclosed features. In addition to the use cases listed below, the disclosure contemplates many other examples, embodiments, implementations, and use cases that use combinations of the features and aspects described in the individual use cases. For example, one or more use cases describe a camera device positioned in/on the camera car and that is communicatively coupled to a processor in an ALPR system by a wired connection and/or a wireless connection. The use cases may also operate in an environment where the camera device is physically apart from the processor and is communicatively coupled to the processor with one of a wired and wireless connection. For example, in one example the camera device attached to the police vehicle includes a plurality of cameras arranged at different locations of the police vehicle and configured to operate in a coordinated manner to capture images of vehicle license plates or other items. Moreover, in some examples, at least one of the aforementioned plurality of cameras may include an unmanned aerial vehicle (UAV) equipped with video capture capabilities. The UAV may be mounted to the vehicle and may be automatically launched as appropriate by the ALPR system upon occurrence of particular trigger events. In addition, one or more embodiments include computerized methods, systems, devices, and apparatuses that capture images of one or more moving vehicles (i.e., a target vehicle) from another moving vehicle (i.e., subject vehicle).

Embodiments according to various aspects of the disclosure may comprise an ALPR system configured to operate in a predetermined environment. In some embodiments, including as further shown in FIG. 1, the predetermined environment may comprise a roadway or other vehicular path on which a subject vehicle may travel. An ALPR system may be mounted to the subject vehicle as it is positioned within the predetermined environment. FIG. 1 shows an illustrative roadway on which a subject vehicle and one or more target vehicles may be traveling while the subject vehicle is operating in accordance with one or more example embodiments. The ALPR system may be mounted on the subject vehicle with a predetermined orientation selected to capture the one or more target vehicles in image data generated by the ALPR system.

Regarding FIG. 1, a subject vehicle 104 comprising an ALPR system 100 travels on a roadway 106 with one or more target vehicles 108. The one or more target vehicles 108 may comprise a first target vehicle 108A and a second target vehicle 108B. The ALPR system 100 comprises a camera apparatus capturing a field of view 102. The camera apparatus is oriented relative to subject vehicle 104 to capture a predetermined portion of an environment around subject vehicle 104. The camera apparatus or camera, alternately used herein, may comprise a forward-facing camera. The camera may be mounted on subject vehicle 104 such that field of view 102 includes a forward direction in which subject vehicle 104 may travel. Field of view 102 may be oriented in a same direction as a windshield of subject vehicle 104. The ALPR system may comprise a bracket that orients a camera of the ALPR system in a predetermined, forward direction relative to a windshield or other part of subject vehicle 104. As mounted, the field of view 102 includes at least a portion of the roadway 106 adjacent to the subject vehicle 104 (e.g., a portion of roadway ahead of or behind the subject vehicle). The field of view 102 may be further directed toward a lane in which the subject vehicle may travel. A center of field of view 102 may be aligned with a center of subject vehicle 104. A center of field of view 102 may be aimed in a forward direction, corresponding to a direction from a rear-view mirror to a front bumper of subject vehicle 104. In accordance with a known orientation of ALPR system 100, relative locations of object subsequently captured in image data detected by ALPR system 100 may also be determined.

In practice, target vehicles 108 on the roadway 106 may be traveling in an opposite or a same direction as the subject vehicle 104. Target vehicles 108 may be traveling at different speeds and may be at different distances. Additionally, the continuous flow of new target vehicles on the roadway 106 (e.g., oncoming traffic, following traffic, and leading traffic) adds complexity to image capture, in addition to or alternately to various configurations of roadways (e.g., intersections, offramps, passing lanes, etc.) on which subject vehicle 104 may travel or otherwise be positioned. Target vehicles 108 may maintain different speeds and/or different distances from the subject vehicle 104 based at least in part on, for example, whether the target vehicles 108 share a lane with the subject vehicle 104, other traffic is occupying the roadway 106, and other outstanding conditions.

Despite varying conditions, objects may be disposed within field of view 102 at predictable distances. For example, a minimum safe driving distance between a subject vehicle 104 and second target vehicle 108B sharing a same lane of the roadway 106 may provide a distance at which a license plate of second target vehicle 108B may be disposed. Because subject vehicle 104 and first target vehicle 108B may travel in adjacent lanes, first target vehicle 108B may be disposed at a second distance away from a camera of ALPR system 100. Target vehicles 108 may be disposed at such distances at least once while subject vehicle 104 is proximate target vehicles 108 or, alternately for a period of time while the vehicles 104,108 are proximate. Distances at which such objects may be located within different parts of field of view 102 may be different. For example, one or more target vehicles of target vehicles 108 adjacent to subject vehicle 104 may be closer to subject vehicle 104 than another target vehicle 108 directly in front of subject vehicle 104. The objects may be located at other distances over a period of time. However, a predetermined distance may correspond to a common distance at which an object with a portion of field of view 102. The predetermined distance may comprise a mode distance. The predetermined distance may comprise a distance that occurs most frequently over a set of observed distances. Alternately or additionally, the distance may comprise one or more of a mean distance or a median distance at which an object is expected to be disposed with a corresponding region of field of view 102. In embodiments, including as further discussed below, a focus distance associated with different regions of field of view 102 may also be defined by an asymmetric optical element in order to improve fidelity of image data in which the object is captured by ALPR system 100.

As used here, a field distance may comprise a distance between an ALPR system and an object. For example, a first field distance may comprise a physical, direct distance between ALPR system 100 and first target vehicle 108A. A second field distance may comprise a physical, direct distance between ALPR system 100 and second target vehicle 108B. More specifically, the field distance may comprise a distance between a camera of the ALPR system and the object. Further, the field distance may comprise a distance between a lens of the ALPR system and the object. Objects located at different distances relative to a same ALPR system, such as ALPR system 100, may be captured in same image data by the ALPR system despite being located at different field distances. The field distance may comprise a distance between the ALPR system and the object at a time at which the image data is detected. In embodiments, a focus distance of an ALPR system may be controlled in accordance with a field distance of different objects in order improve image data in which the different objects may be captured.

In embodiments, each vehicle of the target vehicles 108 may be within a field of view 102 of camera of ALPR system 100. The target vehicles 108 may be within field of view 102 in accordance with a manner in which system 100 is mounted to subject vehicle 104. In accordance with the field of view 102, the target vehicles 108 may be captured in image data captured by a same ALPR system 100. The target vehicles 108 may further be captured in same image data detected by the ALPR system. Capture of multiple target vehicles 108 by a same ALPR system, including in same image data, may enable efficient license plate recognition operations to be performed. For example, use of a same ALPR system may avoid a need for additional cameras to be provided and/or for separate image data to be captured for each vehicle. In accordance with focus areas as further discussed below, the same ALPR system and/or same image data may further capture such target vehicles 108 at different field distances while maintaining focus of these different objects. Embodiments according to various aspects of the present disclosure may enable a same camera to capture license plates affixed to one or more target vehicles, including different target vehicles positioned at different distances away from an ALPR system.

Figure 2:
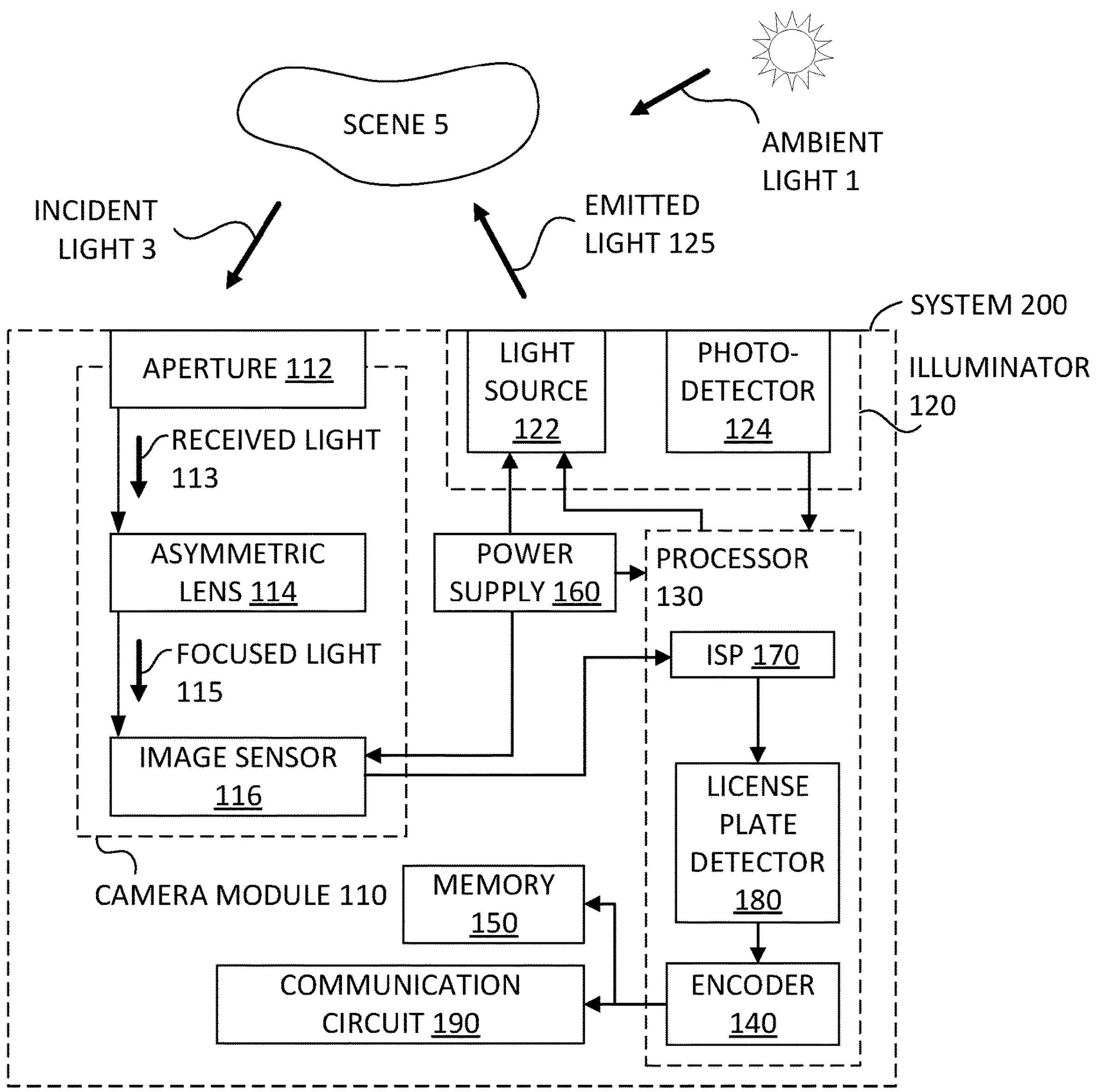
FIG. 2 is an example architecture of a camera apparatus of an automatic license plate recognition (ALPR) system, in accordance with various embodiments.

In various embodiments and with reference to FIG. 2, ALPR system 100 as described in conjunction with FIG. 1 may be similar to, or have similar aspects and/or components with, ALPR system 200. It should be understood by one skilled in the art that FIG. 2 is an example illustration of ALPR system 200, and one or more of the components of ALPR system 200 may be located in any suitable position within, or external to, ALPR system 200. Components of ALPR system 200 may be configured to be housed in a single enclosure, or multiple enclosures. ALPR system 200 may be configured to be disposed in a location for monitoring a scene, such as mounted to a vehicle (e.g., inside a vehicle cabin, on the exterior of a vehicle, etc.) as illustrated in conjunction with FIG. 1 or mounted to a stationary structure (e.g., building, wall, post, etc.). In various embodiments, ALPR system 200 may be an in-vehicle surveillance system. Additionally, it should be understood by one skilled in the art that FIG. 2 is an example illustration of an ALPR system 200 using an asymmetric optical element that provides at least one focus area to improve image data. In other examples, the ALPR system 200 may comprise additional, fewer, or different components, and the components may perform one or more different functions than described herein. In the example of FIG. 2, ALPR system 200 may comprise a camera module 110, an illuminator 120, a processor 130, a memory 150, and a power supply 160.

In various embodiments, camera module 110 may be configured to detect (e.g., generate) image data from incident light, such as incident light 3. Incident light 3 may comprise light received from a scene (e.g., object), such as scene 5. Incident light 3 may comprise light reflected by a scene (e.g., object), such as scene 5. Incident light 3 may alternately or additionally comprise light emitted by a scene. Scene 5 may include a scene requiring monitoring as described previously herein.

In some embodiments, incident light 3 may comprise wavelengths of ambient light, such as ambient light 1. Ambient light 1 may include light from sources external to system 100, such as natural and artificial sources. For example, ambient light 1 may include light from sources such as the Sun, streetlamps, vehicle headlights, flashlights, incandescent lights, halogen lights, and any other light source external to system 100. Ambient light 1 may include light having visible wavelengths, near-infrared wavelengths, and combinations thereof. In other embodiments, in addition to wavelengths of ambient light 1, incident light 3 may comprise wavelengths of emitted light, such as emitted light 125, emitted by light source 122 as discussed further herein.

In various embodiments, camera module 110 may be configured to generate image data corresponding with scene 5. Camera module 110 may generate image data continuously as sequential frames. The sequential frames may be presented serially to provide video data. One or more components of camera module 110 may be located in any suitable position within, or external to camera module 110. Camera module 110 may include components for receiving light, filtering and/or focusing light, and detecting light. For example, camera module 110 may include aperture 112, asymmetric lens 114, and image sensor 116.

In various embodiments, aperture 112 may comprise a hole (e.g., opening) in a housing for receiving incident light 3. The size of aperture 112 may be fixed or variable. Aperture 112 may optically couple scene 5 with image sensor 116. A diameter of aperture 112 may be about 0.050 inches (1.27 millimeters) to about 0.250 inches (6.35 millimeters), about 0.250 inches (6.35 millimeters) to about 0.50 inches (12.7 millimeters), about 0.50 inches (12.7 millimeters) to about 1 inch (25.4 millimeters), about 1 inch (25.4 millimeters) to about 1.5 inches (38.1 millimeters), about 1.5 inches (38.1 millimeters) to about 2 inches (50.8 millimeters), or any other suitable diameter greater than about 0.050 inches (1.27 millimeters) and less than about 2 inches (50.8 millimeters), wherein the diameter is a maximum with of aperture 112, and about as used in the above contexts refers only to plus or minus 0.01 inches (0.254 millimeters).

In various embodiments, asymmetric lens 114 may be configured to focus wavelengths of light. Asymmetric lens 114 may comprise a fixed (e.g., non-adjustable, non-moving) lens. Asymmetric lens 114 may be disposed in a fixed position relative to image sensor 116. Asymmetric lens 114 may be configured to focus light received by aperture 112, such as received light 113, and provide focused light, such as focused light 115, to an image sensor 116. Asymmetric lens 114 may comprise a fixed lens having a curvature configured to focus received light 113. The curvature may define one or more focus areas relative to the field of view (e.g., relative to the scene 5) of the camera module 110. For example, asymmetric lens 114 may comprise a fixed lens having one or more physical regions that each provide a respective focus area. A focus area may comprise a physical region of an asymmetric optical element, such as asymmetric lens 114, that has a focus distance selected in accordance with an object to be detected in image data. A focus area may be aligned with a portion of a field of view of camera module 130. Upon mounting of ALPR system 200, such as ALPR system 100 in subject vehicle 104 with brief reference to FIG. 1, a focus area may further be aligned with a portion of field of view in which an object to be captured in image data will be provided. In embodiments, each physical region of the one or more physical regions of asymmetric lens 114 comprises a respective curvature configured to provide a respective focus area relative to an overall field of view of camera module 130.

A focus area of the field of view of the camera module 110 corresponds to a region of scene 5 captured by the camera module. A field of view may be divided in accordance with two or more focus areas, and each focus area of the two or more focus areas may comprise any continuous region of the field of view. In some examples, the one or more focus areas of the field of view are divided radially from a first point of the field of view, e.g., from a center of the field of view. In other examples, the one or more focus areas divided in other ways, e.g., divided vertically, horizontally, or diagonally along axes of the field of view. In various examples, one or more focus areas may be vertically asymmetric. In various examples, one or more focus areas may be horizontally asymmetric.

In various embodiments, focus areas are associated with a minimum focus distance and a maximum focus distance. Minimum focus distance refers to a minimum distance between camera module 110 and an object of scene 5 wherein ALPR system 200 is configured to detect license plate information. Maximum focus distance refers to a maximum field distance between camera module 110 and field location of object of scene 5 wherein ALPR system 200 is configured to detect license plate information. Distances between minimum focus distance and maximum focus distance represent a range of distances between which the camera module 110 is able to detect license plate information. In some embodiments, minimum focus distance and maximum focus distance are fixed based at least in part on an expected field distance between camera module 110 and license plates in scene 5 during operation of ALPR system 200. In other embodiments, minimum focus distance and maximum focus distance are fixed based at least in part on one or more physical properties of the ALPR system 200.

Asymmetric lens 114 may comprise a curvature configured to optimize one or more focus areas based at least in part on an expected distance from the camera module 110 to a field location of an object of interest (e.g., a target vehicle) of the scene 5. For example, camera module 110 of ALPR system 200 may be mounted in a subject vehicle as illustrated in FIG. 1. A first focus area of a field of view of camera module 110 may correspond to a region of scene 5 directly in front of the subject vehicle, e.g., such that a target vehicle traveling in a same lane as the subject vehicle is expected to be captured by the camera module. It is beneficial for the camera module 110 to generate image data that clearly captures a license plate of the target vehicle. As such, a curvature of at least a portion of the asymmetric lens 114 corresponding to the first focus area may be selected such that the camera module 110 clearly captures objects of scene 5 at a safe following distance, e.g., 100 ft. In another example, a second focus area of a field of view of camera module 110 may correspond to a region of scene 5 to a left or right side of subject vehicle, e.g., such that a target vehicle traveling in an adjacent lane as the subject vehicle is expected to be captured by the camera module. Because target vehicles in adjacent lanes to the subject vehicle may be captured at a closer distance to the camera module 110, e.g., as oncoming target vehicles pass the subject vehicle, a curvature of at least a portion of the asymmetric lens 114 corresponding to the second focus area may be selected such that the camera module 110 clearly captures objects of scene 5 at a shorter distance, e.g., 50 ft.

In some embodiments, asymmetric lens 114 may additionally or instead be tilted at an angle relative to image sensor 116, the angle configured to modify one or more focus areas of the field of view of the camera module 110. In the example wherein camera module 110 of ALPR system 200 is mounted in a subject vehicle as illustrated in FIG. 1, top portion of the field of view of the camera module 110 may be unlikely to capture license plate information. As such, in some embodiments, asymmetric lens 114 may be tilted at an angle such that top portion of the field of view is de-emphasized relative to bottom portion of the field of view. In other embodiments, asymmetric lens 114 may be rotated during assembly of the camera module 110 such that areas of the asymmetric lens having higher quality are oriented towards bottom portion of the field of view and areas of the asymmetric lens having lower quality are oriented towards top portion of the field of view. In embodiments, a higher quality area may focus received light with increased fidelity relative to a lower quality area. For example, and relative to a lower quality area, a higher quality area may transmit a greater amount of received light, focus the light more evenly across an image sensor, comprise a more accurate focus distance relative to a desired focus distance, and/or comprise a more consistent focus distance across the area among various differences.

In some embodiments, and with reference to FIG. 2, asymmetric lens 114 may be disposed between image sensor 116 and aperture 112. For example, incident light 3 may be received by aperture 112 and asymmetric lens 114 may focus received light 113 and pass focused light 115 to image sensor 116 for detection. In other embodiments, aperture 112 may be disposed between asymmetric lens 114 and image sensor 116. For example, incident light 3 may be received by asymmetric lens 114, and asymmetric lens 114 may focus the received light and pass focused light 115 to image sensor 116 for detection. In yet other embodiments, aperture 112 may encompass asymmetric lens 114. That is, asymmetric lens 114 may be disposed within aperture 112.

In various embodiments, camera module 110 may include other elements to aid in gathering light and detecting image data. For example, camera module 110 may include one or more filters configured to filter received light 113. In another example, camera module 110 may include optics configured to further focus focused light 115 on image sensor 116 for detection. Because system 200 may detect visible light and near-infrared light, the optics may comprise one or more optical elements configured to minimize focal deviation between shorter wavelengths of visible light and longer wavelengths of near-infrared light. In some embodiments, the optics may comprise IR-corrected optics. IR-corrected optics may include low dispersion optical elements to compensate for varying focal points between visible light and near-infrared light. In a preferred embodiment, the optics may be configured such that focused light 115 is focused reasonably well on image sensor 116. In other words, the optics may be configured to minimize deviation between the focal plane of visible light plane and the focal plane of near-infrared light. In addition to optics, camera module 110 may also comprise other imaging components such as a lens hood, a mechanical shutter, and the like.

In various embodiments, image sensor 116 may be configured to detect light, such as focused light 115, and to generate raw (e.g., sensor) image data corresponding to intensity of the detected light. Image sensor 116 may capture image data continuously as sequential frames. The sequential frames may be presented serially to provide video data. Image sensor 116 may comprise a charge-coupled device (CCD), a complementary metal-oxide sensor (CMOS), or any other sensor suitable of detecting raw image data from light. Image sensor 116 may be configured to detect visible light and a portion of near-infrared light. That is, image sensor 116 may have a non-zero quantum efficiency in the visible spectrum and a portion of the near-infrared spectrum. Image sensor 116 may comprise a monochrome image sensor configured to filter visible and/or infrared wavelengths of focused light 115. In other embodiments, image sensor 116 may additionally or instead comprise a color filter array (e.g., color filter stack) or other filter configured to filter focused light 115.

In various embodiments, image sensor 116 may comprise a curvature configured to provide (e.g., define, generate, establish, etc.) one or more focus areas of the field of view. Similar to curvature of asymmetric lens 114, image sensor 116 may comprise a fixed lens having one or more regions, wherein each region of the one or more regions comprises a curvature configured to optimize one or more corresponding focus areas of the field of view. In various embodiments, image sensor 116 may additionally or instead be tilted to de-emphasize one or more focus areas of the field of view, similar to tilt of asymmetric lens 114.

In various embodiments, camera module 110 may comprise one or more asymmetric lenses 114, each lens of the one or more asymmetric lenses comprising a corresponding curvature and/or tilt, and an image sensor 116 having a corresponding curvature and/or tilt. For example, the one or more asymmetric lenses 114 may be disposed in series in camera module 110, such that received light 113 is focused through the series of one or more asymmetric lenses 114 to produce focused light 115. The focused light 115 is received by image sensor 116. The series of one or more asymmetric lenses 114 and/or the image sensor 116 may comprise a series of curvature and/or tilts to modify one or more focus areas of the field of view.

In various embodiments, image sensor 116 may be electrically coupled to power supply 160, processor 130, and/or image signal processor (ISP) 170. For example, image sensor 116 may receive power from power supply 160, receive instructions from processor 130, provide signals corresponding with an amount of ambient light available to processor 130, and/or provide raw image data to ISP 170. Raw image data may comprise analog or digital data corresponding with light detected by image sensor 116. In various embodiments, image sensor 116 may comprise asymmetric lens 114. For example, asymmetric lens 114 may be directly packaged with image sensor 116.

In various embodiments, illuminator 120 may be configured to provide scene 5 with near-infrared illumination. One or more components of illuminator 120 may be located in any suitable position within, or external to, illuminator 120. For example, in some embodiments camera module 110 may comprise one or more components of illuminator 120. In various embodiments, illuminator 120 may comprise a light source 122 and a photodetector 124.

Light source 122 may comprise an emitter capable of emitting a predetermined band of light, such as a light emitting diode (LED), laser, or any other suitable emitter. Light source 122 may be electrically coupled with power source 160 and/or processor 130. According to an operating mode of system 200, light source 122 may be configured to emit light, such as emitted light 125. For example, in IR mode, light source 122 may receive power from power supply 160 and emit emitted light 125. In IR mode, processor 130 may enable power supply 160 to provide power to light source 122 and/or provide power directly to light source 122. In embodiments, an emission band of emitted light 125 may comprise a near-infrared band.

In various embodiments, light source 122 may comprise a peak output power. For example, a peak output power of light source 122 may be between 100 milliwatts to 200 milliwatts, between 200 milliwatts to 400 milliwatts, between 400 milliwatts to 800 milliwatts, between 800 milliwatts to 1,500 milliwatts, between 1,500 milliwatts to 3,000 milliwatts, between 3,000 milliwatts to 10,000 milliwatts or any other suitable peak power between 100 milliwatts and 10,000 milliwatts. In other embodiments, the peak output power may be between 700 milliwatts and 1,000 milliwatts. In response to the amount of ambient light detected (e.g., the amount of ambient visible light detected), the power output of light source 122 may be adjusted by processor 130.

In various embodiments, light source 122 may comprise a peak radiant intensity. For example, a peak radiant intensity of light source 122 may be between 50 milliwatts per steradian and 70 milliwatts per steradian, between 70 milliwatts per steradian and 90 milliwatts per steradian, between 90 milliwatts per steradian and 150 milliwatts per steradian, and between 150 milliwatts per steradian and 1,000 milliwatts per steradian, or any other suitable peak radiant intensity between 50 milliwatts per steradian and 1,000 milliwatts per steradian.

In various embodiments, system 200 may be mounted in an interior of a vehicle. Aperture 112 may be oriented toward an exterior of the vehicle. Light source 122 may also be oriented toward the exterior of the vehicle. Light source 122 may be directed at a target vehicle of scene 5 (e.g., first target vehicle 108A with brief reference to FIG. 1). Light source 122 may be aligned with a field of view of camera module 130 (e.g., field of view 102 with brief reference to FIG. 1). For example, light source 122 may direct emitted light 125 across the field of view or toward portions of the field of view, such as the edges of the field of view.

In some embodiments, a sensor, such as photodetector 124, may be configured to detect an amount of ambient light available. Photodetector 124 may be configured to detect an amount (e.g., power, intensity, illuminance, etc.) of ambient light by converting photons into electrical current. Photodetector 124 may comprise devices such as photoresistors (e.g., cadmium sulfide photocells, cadmium selenium photocells, etc.), photodiodes, phototransistors, etc. Photodetector 124 may comprise photoelectric sensors, semiconductor sensors, photovoltaic cells, thermal sensors, photochemical sensors, or any other suitable sensor configured to detect available light. Photodetector 124 may be electrically coupled to processor 130 and report a signal corresponding to the amount of ambient light (e.g., the amount of ambient light available) to processor 130.

In various embodiments, photodetector 124 may only be sensitive to visible light, such that the signal detected by photodetector 124 corresponds with an amount of ambient visible light available. In this manner, when light source 122 is active, emitted light 125 will not contribute to the amount of ambient light detected by photodetector 124. For example, photodetector 124 may comprise a filter to block a band of near-infrared light corresponding with the band of near-infrared light emitted by light source 122.

In other embodiments, image sensor 116 may perform the functions of photodetector 124. For example, image sensor 116 may report a signal corresponding with an amount (e.g., power, intensity, illuminance, etc.) of ambient light available to processor 130. However, because image sensor 116 is sensitive to near-infrared light, emitted light 125 may contribute to the amount of ambient light detected by image sensor 116. In some embodiments, to overcome this, when active, light source 122 may be rapidly switch on and off, and image sensor 116 may be configured to report a signal corresponding with an amount of ambient light available during the off pulse, such that the signal does not correspond with an amount of emitted light 125. In other embodiments, if the gain of image sensor 116 exceeds a reference value, such as for example, 20×, 25×, or 30× (signifying additional illumination may be necessary), light source 122 may be activated. Once light source 122 is activated, as the gain of image sensor 116 decreases below a reference value, such as for example 10× or 15× (signifying additional illumination may no longer be necessary), light source 122 may be deactivated.

In various embodiments, a processing circuit, such as processor 130, may comprise any circuitry, electrical components, electronic components, software, and/or the like configured to perform various operations and functions discussed herein. For example, processor 130 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, an encoder, and/or any combination thereof. In various embodiments, processor 130 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processor 130 may include data buses, output ports, input ports, timers, memory, arithmetic units, and/or the like.

Processor 130 may be configured to provide and/or receive electrical signals whether digital and/or analog in form. Processor 130 may provide and/or receive digital information via a data bus using any protocol. Processor 130 may receive information, manipulate the received information, and provide the manipulated information. Processor 130 may store information and retrieve stored information. Information received, stored, and/or manipulated by processor 130 may be used to perform a function, control a function, and/or to perform an operation or execute a stored program.

Processor 130 may control the operation and/or function of other circuits and/or components of system 100. Processor 130 may receive status information regarding the operation of other components, perform calculations with respect to the status information, and provide commands (e.g., instructions) to one or more other components. Processor 130 may command another component to start operation, continue operation, alter operation, suspend operation, cease operation, or the like. Commands and/or status may be communicated between processor 130 and other circuits and/or components via any type of bus (e.g., SPI bus) including any type of data/address bus. In various embodiments, processor 130 may be electronically and/or electrically coupled to image sensor 116. Processor 130 may be configured to receive a signal reported by image sensor 116 corresponding with an amount of ambient light detected by image sensor 116. Processor 130 may determine an ambient lighting condition from the signal received by image sensor 116. For example, processor 130 may determine an ambient lighting condition by comparing the signal with a predetermined reference value. In response to determining the ambient lighting condition, processor 130 may be configured to perform various operations and/or functions, as discussed further herein.

In various embodiments, processor 130 may be electronically and/or electrically coupled to photodetector 124. Processor 130 may be configured to receive a signal reported by photodetector 124 corresponding with an amount of ambient light detected by photodetector 124. Processor 130 may determine an ambient lighting condition from the signal received by photodetector 124. For example, processor 130 may determine an ambient lighting condition by comparing the signal with a predetermined reference value.

In various embodiments, processor 130 may be electronically and/or electrically coupled to light source 122. In response to determining the ambient lighting condition, processor 130 may be configured to provide a control signal to light source 122 and/or power supply 160 corresponding with an operating mode of system 100. For example, in response to determining a first ambient lighting condition from a first amount of detected light, processor 130 may provide a control signal to enable an electrical current to flow from power supply 160 to light source 122, thereby activating light source 122.

In various embodiments, processor 130 may be electrically and/or electronically coupled to power supply 160. Processor 130 may receive power from power supply 160. The power received from power supply 160 may be used by processing circuit 130 to receive signals, process signals, and transmit signals to various other components in system 100. Processor 130 may use power from power supply 160 to detect an ambient lighting condition and generate one or more control signals in response to the detected ambient lighting condition. The control signal may be based on the ambient lighting condition. The control signal may be an electrical signal. The control signal may correspond with an operating mode of system 100. The control signal may be provided to components of system 100, such as image sensor 116, light source 122, ISP 170, and/or encoder 140.

In various embodiments, processor 130 may comprise a system on a chip having functionality of an image processor configured to perform a range of tasks related to image processing. One or more components of processor 130 may be located in any suitable position within, or external to, processor 130. In various embodiments, processor 130 may comprise an image signal processor (ISP) 170, license plate detector 180, and/or an encoder 140.

In various embodiments, ISP 170, may comprise circuitry, electrical components, electronic components, software, and/or the like configured to perform various operations and functions discussed herein. For example, ISP 170 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, an encoder, and/or any combination thereof. In various embodiments, ISP 170 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, processor 130 may include data buses, output ports, input ports, timers, memory, arithmetic units, and/or the like.

ISP 170 may be configured to provide and/or receive electrical signals whether digital and/or analog in form. ISP 170 may provide and/or receive digital information via a data bus using any protocol. ISP 170 may receive information, manipulate the received information, and provide the manipulated information. ISP 170 may store information and retrieve stored information. Information received, stored, and/or manipulated by ISP 170 may be used to perform a function, control a function, and/or to perform an operation or execute a stored program.

In various embodiments, ISP 170 may be electronically and/or electrically coupled to image sensor 116. ISP 170 may receive raw image data from image sensor 116 and perform various image signal processing tasks on the raw image data, such as demosaicing, noise reduction, image sharpening, filtering, lens distortion correction, autofocus, autoexposure, auto white balance processing, high dynamic range processing, color correction, etc. In embodiments, a camera of system 200 may comprise camera module 110 or, alternately, camera module 110 and ISP 170, according to various aspects of the present disclosure.

In some embodiments, ISP 170 may perform default auto white balance processing. In some embodiments, additionally or instead of default auto white balance processing, ISP 170 may perform partial white balance processing to improve color fidelity under certain lighting conditions (e.g., conditions in which ambient light 1 comprises light emitted from incandescent light sources, such as halogen headlights and/or halogen streetlamps). Image data generated under incandescent (e.g., halogen) light sources, which have high emission in the near-infrared band and low emission in the visible blue band, may require additional color processing to correct for color errors and produce a balanced color (e.g., neutral) image. In embodiments, the near-infrared light emitted by halogen sources may bias the colors of the image toward warmer colors. Under halogen lighting conditions, ISP 170 may apply default white balance processing, in which a stronger gain in the blue and/or green color channels is applied to adjust the color balance such that images appear neutral. For example, target gains under default white balance processing for halogen lighting conditions may include 1× for the red color channel, 2× for the green color channel, and 5× for the blue color channel. Alternatively, under halogen lighting conditions, ISP 170 may apply partial white balance processing, in which a weaker gain in the blue and/or green color channels relative to the gain for the blue and/or green color channels applied in default white balance processing, may be applied, thereby resulting in warmer (e.g., non-neutral) images. For example, target gains under partial white balance processing may include 1× for the red color channel, 1.5× for the green color channel, and 2.5× for the blue color channel. In some instances, warmer, non-neutral images may be preferable to neutral and/or cooler images.

In embodiments in which image sensor 116 comprises an RGB-IR image sensor, ISP 170 may use raw image data from the sensor to change the color processing accordingly to minimize any unwanted effects on color reproduction attributed to near-infrared light. That is, ISP 170 may apply color correction in accordance with infrared data received by the RGB-IR image sensor to improve color fidelity under various lighting conditions. In addition to partial white balance processing ISP 170 and/or processor 130 may further perform other image processing, including desaturating at least one color as further discussed herein.

In various embodiments, ISP 170 may apply color corrections and/or color conversions corresponding with an operating mode of system 100. For example, in color mode, ISP 170 may apply color corrections to best reproduce visible colors and improve color fidelity. As another example, in monochrome mode, ISP 170 may apply color conversions to convert the raw image data into a grayscale format.

In various embodiments, ISP 170 may be electronically and/or electrically coupled to encoder 140. After performing various image signal processing tasks on the raw image data received by image sensor 116, ISP 170 may transmit the processed image data to encoder 140 for encoding to memory 150. In various embodiments, ISP 170 may include the functions of encoder 140 and/or processor 130.

In various embodiments, ISP 170 may be electronically and/or electrically coupled to processor 130. In response to determining an ambient lighting condition, processor 130 may provide instructions to ISP 170 to encode image data received by image sensor 116 in a specified mode. For example, in response to determining a first ambient lighting condition, processor 130 may be configured to provide instructions to ISP 170 to encode image data in a first mode corresponding with a first operating mode system 100. As another example, in response to determining a second ambient lighting condition, processor 130 may provide instructions to encoder 140 to encode image data in a second mode, corresponding with a second operating mode of system 100.

In various embodiments, ISP 170 may be electronically and/or electrically coupled to license plate detector 180. After performing various image signal processing tasks on the raw image data received from image sensor 116, ISP 170 may transmit the processed image data to license plate detector 180 for detection of one or more license plates in the image data. In various embodiments, ISP 170 may include the functions of encoder 140, license plate detector 180, and/or processor 130.

In various embodiments, license plate detector 180 may comprise electrical components, electronic components, software, and/or the like configured to perform various operations and functions discussed herein. For example, license plate detector 180 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, an encoder, and/or any combination thereof. In various embodiments, license plate detector 180 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, license plate detector 180 may include data buses, output ports, input ports, timers, memory, arithmetic units, and/or the like.

In embodiments, license plate detector 180 may be configured to receive image data in which a field of view of a camera is represented. For example, camera module 110 may be configured to capture field of view 102 with brief reference to FIG. 1. One or more target vehicles 108 may be positioned within field of view 102 at a time that image data corresponding to the field of view is detected by camera module 110. Accordingly, one or more target vehicles, such as first target vehicle 108A and second target vehicle 108B may be represented in the image data in accordance with a field of view of camera module 110. This image data may subsequently be provided to license plate detector 180 for further processing.

In embodiments, license plate detector 180 may be configured to detect one or more license plates in image data. As noted above, image data corresponding to a field of view may be received by license plate detector 180, wherein one or more target vehicles may be represented in the image data. Each target vehicle may have a respective license plate mounted on the vehicle. Accordingly, the image data may comprise information representing one or more license plates. For example, and with brief reference to FIG. 1, a first license plate of first vehicle 108A and a second license plate of second vehicle 108B may be captured in same image data. In other examples, license plates of two or more target vehicles 108 may be captured in separate image data. For example, the image data may comprise video data and two different license plates may be represented in different frames of the video data. License plate detector 180 may apply one or more image processing operations to detect the one or more license plates from the image data. For example, detecting the one or more license plates may comprise detecting a visual property associated with one or more of a vehicle and/or license plate. In some embodiments, a visual property may comprise a shape, size, color, and relative position of the vehicle and/or license plate in the image data. Detecting the one or more license plates may comprise identifying one or more respective portions of the image data in which each license plate of the one or more license plates is represented. In embodiments, detecting the one or more license plates may comprise applying a previously trained machine learning algorithm to the image data. Detecting the one or more license plates may comprise generating information identifying the one or more license plates detected in the image data. For example, the information may comprise one or more of a number of detected license plates, a location within the image data at which a respective license plate was identified, and/or cropped image data extracted from the image data, wherein the cropped image data is detected to represent a respective license plate.

Figure 3A:
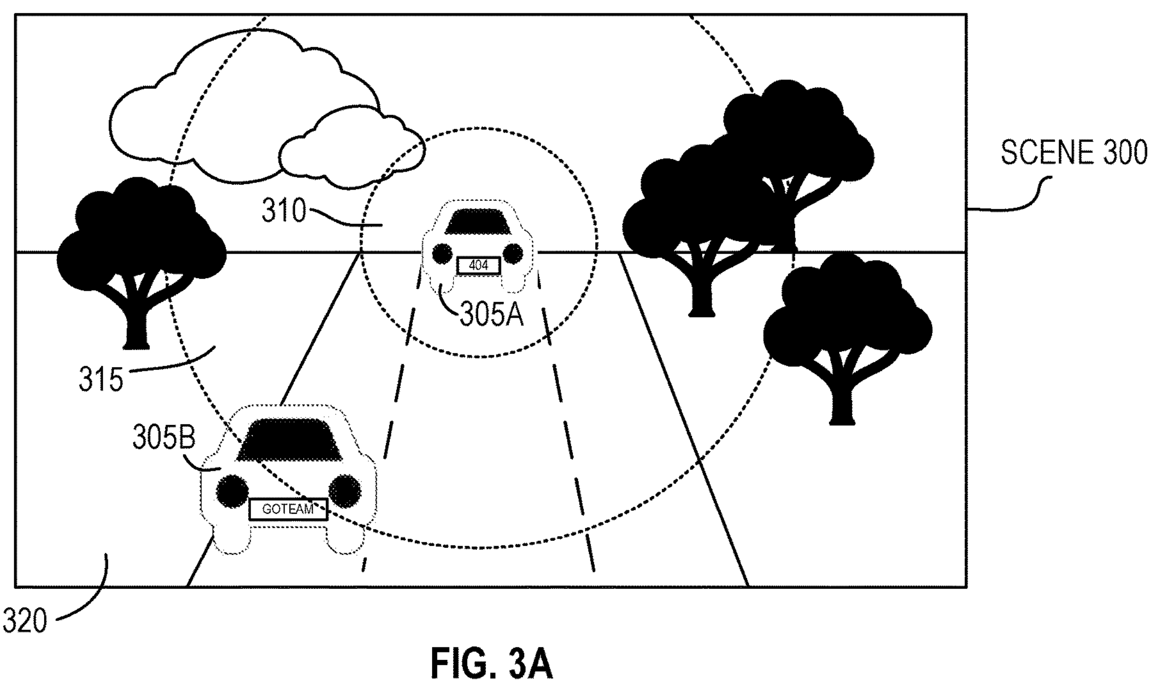
FIG. 3A is an example illustration of a scene captured by a camera apparatus of an ALPR system, in accordance with various embodiments.
Figure 4A:
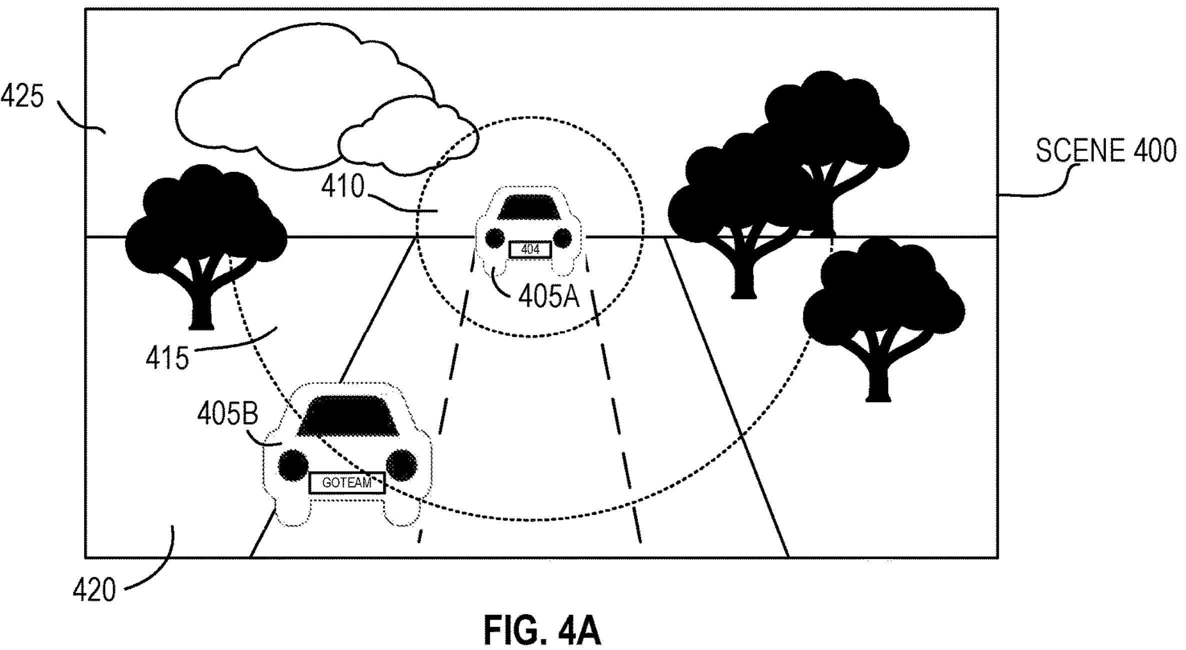
FIG. 4A is an example illustration of a scene captured by a camera apparatus of an ALPR system, in accordance with various embodiments.

In embodiments, license plate detector 180 may be configured to identify license plate information from the one or more detected license plates. Identifying the license plate information may comprise applying an optical character recognition operation to image data in which a license plate is detected. Alternately or additionally, identifying the license plate information may comprise applying a previously trained machine learning algorithm to the image data for the detected license plate, wherein the algorithm is configured to generate license plate information. In some embodiments, the algorithm may be a same or different algorithm relative that which is used to detect the license plate in the image data. The license plate information may comprise information indicating one or more alphanumeric characters represented in the detected license plate. For example, license plate information comprises a sequence of alphanumeric characters such as "GOTEAM" or "404" as illustrated in FIGS. 3A, 4A. Alternately or additionally, the license plate information may comprise information identifying an issuing entity and/or geographic area associated with the license plate. For example, a state or country associated with an entity that issued a license plate may be identified and indicated in license plate information.

In various embodiments, license plate detector 180 may be electronically and/or electrically coupled to encoder 140. After performing various image signal processing tasks on the processed image data received from ISP 170, license plate detector 180 may transmit processed image data to encoder 140 for encoding to memory 150. The processed image data may comprise the image data received from ISP 170. Alternately or additionally, the processed image data may comprise cropped image data in which a license plate is represented and/or information identifying each license plate of one or more license plates identified in the image data received from ISP 170 by license plate detector 180.

In various embodiments, encoder 140 may comprise electrical components, electronic components, software, and/or the like configured to perform various operations and functions discussed herein. For example, encoder 140 may comprise a processing circuit, a processor, a digital signal processor, a microcontroller, a microprocessor, an application specific integrated circuit (ASIC), a programmable logic device, logic circuitry, state machines, MEMS devices, signal conditioning circuitry, communication circuitry, a computer, a computer-based system, a radio, a network appliance, a data bus, an address bus, an encoder, and/or any combination thereof. In various embodiments, encoder 140 may include passive electronic devices (e.g., resistors, capacitors, inductors, etc.) and/or active electronic devices (e.g., op amps, comparators, analog-to-digital converters, digital-to-analog converters, programmable logic, SRCs, transistors, etc.). In various embodiments, encoder 140 may include data buses, output ports, input ports, timers, memory, arithmetic units, and/or the like.

Encoder 140 may be configured to provide and/or receive electrical signals whether digital and/or analog in form. Encoder 140 may provide and/or receive digital information via a data bus using any protocol. Encoder 140 may receive information, manipulate the received information, and provide the manipulated information. Encoder 140 may store information and retrieve stored information. Information received, stored, and/or manipulated by encoder 140 may be used to perform a function, control a function, and/or to perform an operation or execute a stored program In various embodiments, encoder 140 may be configured to encode processed image data received by ISP 170 in a coding format, such as MPEG-2 (H.262), MEPG-4 (H.264), HEVC (H.265), AOMedia Video 1 (AV1), etc. Encoder 140 may be configured to encode the processed age data in a specified mode, such as color, black and white, monochrome, grayscale, etc. Encoder 140 may convert a sequence of image data (e.g., processed image data) over time into video data.

In various embodiments, encoder 140 may be electronically and/or electrically coupled to, processor 130, memory 150, ISP 170, license plate detector 180, communication circuit 190, and/or power supply 160. Encoder 140 may be configured to receive image data from ISP 170. Encoder 140 may be configured to encode image data processed by ISP 170 to memory 150. Encoder 140 may be configured to receive a control signal from processor 130 corresponding with an operating mode of system 100. For example, encoder 140 may receive a control signal from processor 130 instructing encoder 140 to encode image data in a specified mode, in accordance with an operating mode of system 100. For example, in a first operating mode of system 100, encoder 140 may receive a first control signal from processor 130 to encode image data in monochrome to memory 150. Encoder 140 may encode the image data using a monochrome image file format (e.g., first data format) in accordance with the first control signal. As another example, in a second operating mode of system 100, encoder receive a second control signal from processor 130 to encode image data in color to memory 150. Encoder 140 may encode the image data using a color image file format (e.g., second data format, different from a first data format) in accordance with the second control signal. Encoder 140 may further receive information identifying one or more license plates identified in the image data. In embodiments, encoder 140 may include this information in metadata associated with the encoded image data in which the license plate was detected and identified.

In various embodiments, encoder 140 may be electrically and/or electronically coupled to power supply 160. Encoder 140 may receive power from power supply 160. The power received from power supply 160 may be used by encoder 140 to receive signals, process signals, and transmit signals to various other components in system 100. For example, encoder 140 may use power from power supply 160 to encode processed image data to memory 150.

In various embodiments, memory 150 may be configured to store data for later access by a computing device. In various embodiments, memory 150 may comprise a computer readable medium, such as flash memory, random access memory (RAM), hard disks drives, or any other suitable medium for storing data. Memory 150 may be electrically coupled to image sensor 116, processor 130, encoder 140, ISP 170, and/or power supply 160. For example, memory 150 may be electrically and/or electronically coupled with encoder 140 and configured to store encoded image data received by encoder 140.

In various embodiments, power supply 160 may be configured to provide power to various components of system 100. For example, power supply 160 may provide energy for operating the electronic and/or electrical components (e.g., parts, subsystems, circuits) of system 100, camera module 110, and/or illuminator 120. Power supply 160 may provide electrical power. Providing electrical power may include providing a current at a voltage. Power supply 160 may be electrically coupled to illuminator 120 (e.g., light source 122), processor 130, encoder 140, ISP 170, and/or image sensor 116. Electrical power from power supply 160 may be provided as a direct current ("DC"). Electrical power from power supply 160 may be provided as an alternating current ("AC"). Power supply 160 may include a battery. The energy of power supply 160 may be renewable or exhaustible, and/or replaceable. For example, power supply 160 may comprise one or more rechargeable or disposable batteries. In various embodiments, the energy from power supply 160 may be converted from one form (e.g., electrical, magnetic, thermal) to another form to perform the functions of a system. In various embodiments, power supply 160 may include power provided by a vehicle.

In embodiments, system 200 may comprise a communication circuit 190. Communications circuit 190 may be configured to enable wired or wireless electronic communications between one or more systems or between devices of system 200. For example, communications circuit 190 may enable electronic communications between camera module 110 and processor 130, e.g., electronic communications comprising image data and/or information identifying one or more license plates. In another example, communications circuit 109 may enable electronic communications between system 200 and one or more other systems, such as, e.g., a cloud or remote server, a mobile data terminal (MDT) mounted in subject vehicle, or the like. Communications circuit 190 may enable communication of image data and/or information identifying one or more license plates to the other system for display, comparison with one or more reference license plate numbers in a database, or other subsequent output operation. Communications circuit 190 may comprise any communications channel capable of enabling long-range communications or short-range communications. For example, communications circuit 190 may enable electronic communications through one or more communication channels such as a telephone network, a cellular network, an extranet, an intranet, the internet, a wireless communication, a wireless personal area network (WPAN), a local area network (LAN), a wide area network (WAN), a virtual private network (VPN), and/or the like.

In various embodiments, one or more of the communication channels enabling electronic communications in communications circuit 190 may be unsecure. Electronic communications disclosed herein via communications circuit 190 may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development. In various embodiments, electronic communications (and/or individual data in an electronic communication) may also be digitally signed or may include any other security control.

For the sake of brevity, conventional data networking, application development, and other functional aspects of system may not be described in detail herein. Furthermore, the connecting lines shown in the various figures contained herein are intended to represent exemplary functional relationships and/or electronic communications between the various system 200 components. Many alternative or additional functional relationships or electronic communications may be present in a practical system.

FIG. 3A is an example illustration of a scene captured by a camera apparatus of an ALPR system, in accordance with various embodiments. In various embodiments, ALPR system as described in conjunction with FIG. 3A may be similar to, or have similar aspects and/or components with, any other ALPR system previously discussed, such as ALPR system 100 and/or ALPR system 200. In various embodiments, camera apparatus of ALPR system may be mounted in a subject vehicle, e.g., as described in conjunction with FIG. 1, such that ALPR system is likely to operate on roadways and other vehicle-accessible areas such as parking lots. Scene 300 may comprise a portion of an environment proximate the ALPR system disposed within a field of view of the ALPR system. For example, scene 300 may correspond to visible information detected by ALPR system 100 via field of view 102. Scene 300 may be captured in image data by the ALPR system in accordance with received light and focused light. For example, scene 300 may be detected in accordance with received light that is focused by lens 114 to provide focused light that is subsequently detected by image sensor 116 with brief reference to FIG. 2. Scene 300 may comprise one or more objects of interest to ALPR system captured by camera apparatus. For example, scene 300 may comprise one or more target vehicles 305 at varying field locations relative to camera apparatus. The one or more target vehicles may comprise a first target vehicle 305A and a second target vehicle 305B. Each vehicle of the one or more target vehicles 305 may have a license plate mounted thereto. System 300 may be configured to detect license plate information associated with each vehicle of the one or more target vehicles 305 in accordance with the respective license plate of each vehicle in scene 300 as captured in image data. Scene 300 may additionally comprise one or more additional objects or factors, such as landscape elements, weather elements, pedestrians, bicyclists, and the like.

Because ALPR system is associated with subject vehicle and captures image data of roadways and other vehicle-accessible areas and a camera of ALPR system may have a predetermined and fixed orientation relative to subject vehicle (e.g., forward-facing), a field of view of the camera of an ALPR system may comprise different regions associated with most likely field locations of target vehicles. For example, target vehicles, such as target vehicle 305A, directly in front of camera apparatus of ALPR system are most likely to be in a same lane of a roadway as subject vehicle. As such, subject vehicle is likely to be at a safe following distance (e.g., approximately 100 ft) from target vehicle 305A, and it is beneficial for ALPR system to clearly capture license plate information from safe following distance, such that operators of ALPR system can safely capture accurate license plate information of target vehicles. In another example, target vehicles, such as target vehicle 305B, to a side of camera apparatus of ALPR system are most likely to be in an adjacent lane of a roadway as subject vehicle, at a perpendicular location at an intersection to subject vehicle, parked alongside subject vehicle, or otherwise adjacent to subject vehicle. Subject vehicle is unlikely to maintain a safe following distance from target vehicle 305B, as subject vehicle may be able to pass alongside target vehicle. As such, it is likely that ALPR system may be able to capture image data comprising license plate information of target vehicle 305B at a closer field location, e.g., 25 to 50 ft. from target vehicle.

As used herein, a field location may comprise a point in a field of view of the camera of the ALPR system. The field location may comprise a horizontal position and a vertical position within the two-dimensional field of view. The field location may correspond to a portion of on one or more optical elements of the camera. For example, a field location may correspond to a portion of a lens through which light from the point in the field of view is received and subsequently focused. Alternately or additionally, the field location may correspond to a portion of an image sensor in which focused light for the point in the field of view is detected. For example, a field location may comprise one or more photodetectors in an image sensor configured to generate a pixel of image data. A field location may be detected via an optical element at a corresponding position along the optical element. In embodiments, a region of a field of view may comprise a contiguous set of field locations, including as further captured in image data.

In some embodiments, one or more other regions of scene 300 may be associated with most likely field locations. For example, it may be unlikely that objects of interest appear above a horizontal threshold, e.g., above a horizon line of a roadway. In another example, it may be beneficial for objects beneath a horizontal threshold of field of view of ALPR system to capture clear image data at lower ALPR focus distances, as the corresponding region of scene 300 is closer to subject vehicle. In other examples, other regions of scene 300 may be identified and associated with expected field locations of objects appearing in the regions.

In embodiments, a camera of an ALPR system may be configured to optimize capture of image data for subsequent license plate detection in accordance with regions of a field of view of camera apparatus. The regions may be determined at least in part based on a license plate being disposed in the corresponding region when the camera is mounted in a predetermined position. In embodiments, optimizing capture in the image data may comprise tuning a focus of an optical element of the camera to have different a different focus (e.g., focus distance from the camera to a position in the scene) for different regions of a field of view captured in image data by the camera. As further discussed herein, the optical element may comprise one or more of an asymmetric lens or an asymmetric image sensor.

In embodiments, each portion or position along an asymmetric optical element may have a corresponding focus distance. The focus distance may correspond to a distance extending from the optical element into an external environment to which the portion of the optical element is focused. The focus distance may be fixed, independent of whether an object is disposed at the focus to provide reflected or emitted light. Light received from the focus distance may be detected in focus in subsequent image data. When an object is disposed at the focus distance, light received from the object via the portion of the optical element may be detected in focus in image data. In embodiments, and including as further discussed herein, a focus distance of different portions of an optical element may be defined in accordance with a predetermined field distance of an object to be detected via the different portions.

In embodiments, an asymmetric optical element may provide (e.g., define) one or more focus areas. A focus area may comprise a portion of the optical element aligned with a region of a field of view for which light is received by the optical element. For example, a focus area may comprise a section of a transparent asymmetric lens. Alternately or additionally, a focus area may comprise a set of photodetectors of an image sensor by which focused light is received in a controlled manner in accordance with an alignment of the image sensor with one or more other optical elements of a camera in which the image sensor is provided. A focus area may correspond to a contiguous set of field locations of the optical element, wherein each field location is aligned with a corresponding point of a field of view of the camera. A focus area may comprise a set of focus distances associated with each portion of the asymmetric optical element included in the focus area. The focus area may comprise a minimum focus distance. The minimum focus distance may comprise a smallest field distance (e.g., closest field distance) at which an object may be detected in focus within the focus area. The focus area may comprise a maximum focus distance. The maximum focus distance may comprise a largest field distance (e.g., farthest field distance) at which an object may be detected in focus within the focus area. A focus area may comprise a range of focus distances between a maximum focus distance and a minimum focus distance. In embodiments, different portions of a focus region may comprise a same focus distance, including a maximum focus distance or minimum focus distance associated with the focus area. In embodiments, a focus area may comprise one or more fixed focus distances. To capture different field distances in focus, an asymmetric optical element may comprise multiple fixed focus areas.

In embodiments, a focus distance may correspond to a maximum sharpness at which an object in a scene or environment may be captured in image data. When an object is captured at the maximum sharpness (e.g., in focus), accuracy of subsequent image processing operations may be improved. For example, accuracy of optical character recognition of a license plate captured in image data may be maximized when the license plate is captured with a maximum sharpness in the image data. License plate information may still be detectable for a license plate located away from (e.g., closer or farther) the focus distance; however, an accuracy of such license plate information may be decreased relative to a same license plate captured in image data when positioned at the focus distance.

Figure 3B:
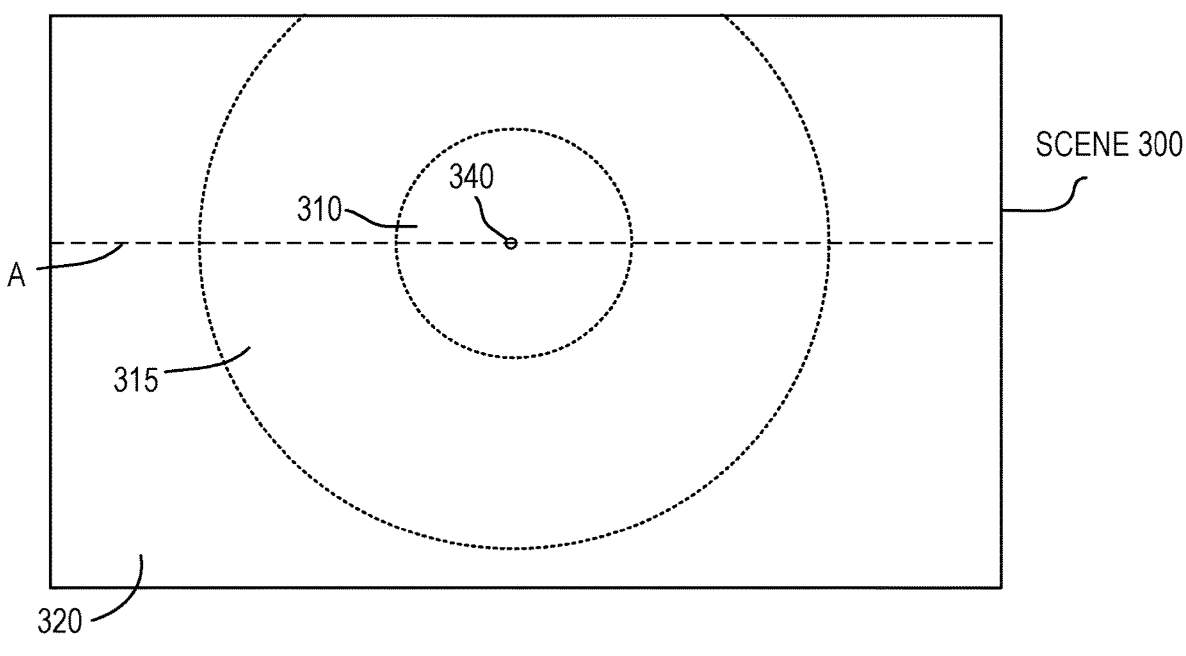
FIG. 3B is an example diagram of an asymmetric lens of a camera apparatus of an ALPR system, in accordance with various embodiments.

In embodiments, an asymmetric lens of a camera of an ALPR system comprises one or more curved portions, the curved portions configured to define focus areas of the lens. For example, a lens may comprise at least two focus areas. Each focus area may comprise a different relative curvature. The focus areas may be determined at least in part on regions of a field of view of a camera apparatus from which light is received by the corresponding portion of the lens. In the example of FIGS. 3A and 3B, asymmetric lens of ALPR system comprises three portions having different curvatures corresponding to three focus areas. FIGS. 3A and 3B illustrate focus areas 310, 315, 320, wherein FIG. 3A illustrates focus areas overlaid on scene 300 and FIG. 3B illustrates focus areas independently of scene.

In various embodiments, first focus area 310 is radially centered at a first point 340 on a lens. First point 340 may be further optically aligned with a location in scene 300 in accordance with a location and orientation of an ALPR system relative to scene 300. The location in scene 300 may correspond to a predetermined location of an object to be imaged when the ALPR system detects image data representing scene 300. For example, light reflected from a target vehicle in scene 300 may be received by an image sensor of the ALPR system via first point 340. Second focus area 315 is radially centered at first point 340 of scene 300. Third focus area 320 comprises portions of field of view distinct from first focus area 310 and second focus area 320, e.g., all adjacent portions of field of view. In various embodiments as shown in FIGS. 3A and 3B, first point is vertically asymmetric, e.g., being located above center of field of view. In embodiment of FIGS. 3A and 3B, first point is horizontally symmetric, e.g., being horizontally centered in field of view of camera apparatus. In other embodiments, first point may be horizontally asymmetric in addition to or instead of being vertically asymmetric.

Figure 3C:
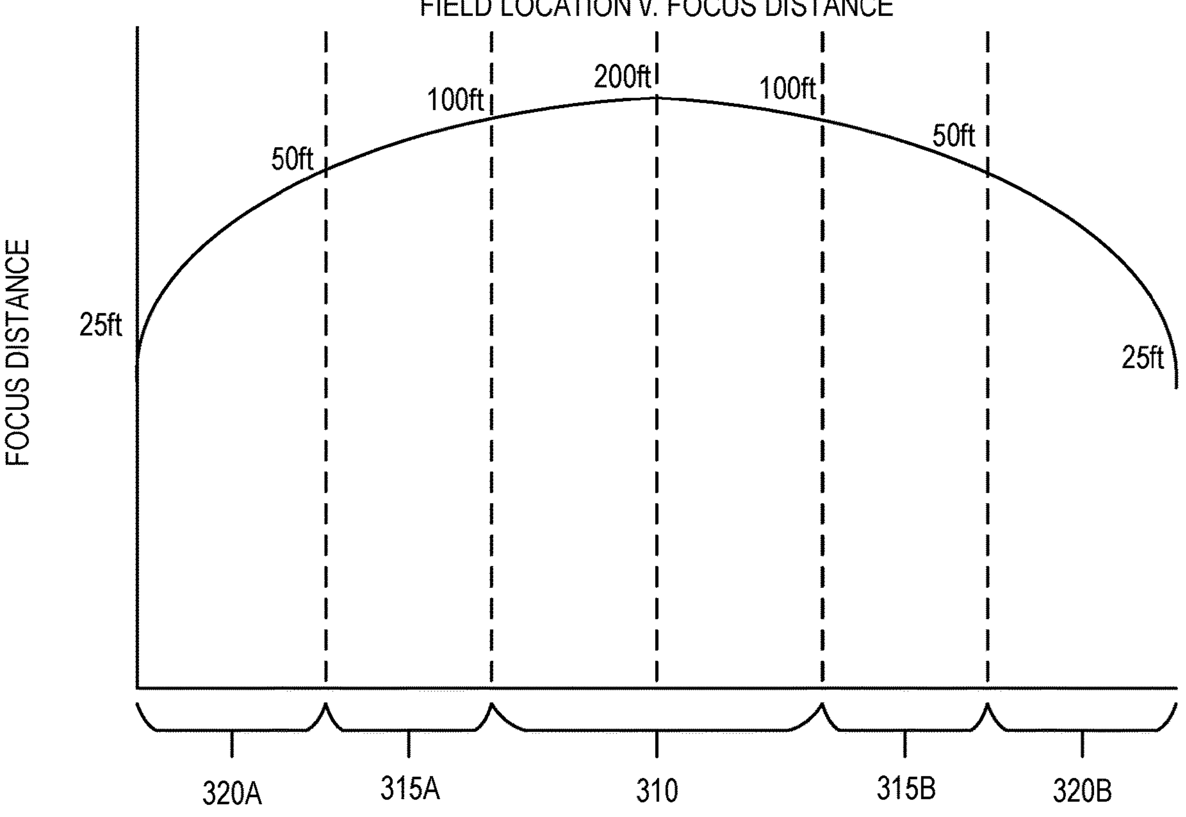
FIG. 3C is an example graph of field location of target vehicles of the ALPR system vs. focus distance of a camera apparatus of the ALPR system, in accordance with various embodiments.

FIG. 3C is an example graph of field location the ALPR system versus focus distance of a camera apparatus of the ALPR system, in accordance with various embodiments. In the provided graph, field location represents a position along an asymmetric optical element. The position may correspond to a location in a field of view captured by a camera in which the asymmetric optical element is provided. The position may correspond to a position (e.g., pixel) in image data detected though use of the asymmetric optical element. In the example of FIG. 3C, the horizontal axis represents a sequence of field locations determined along axis A with brief reference to FIG. 3B. Each position indicated from left to right along the horizontal axis in FIG. 3B may correspond to a position from left to right along axis A in FIG. 3B.

In FIG. 3C, a focus distance comprises a focus (e.g., point of focus) of the asymmetric optical element at a position along the element. As noted above, the position may correspond to a location within a field of view (e.g., field location) comprising the camera and/or a position (e.g., pixel location within an array of pixels) of image data detected via the optical element. The focus distance may comprise a maximum focus at the field location. Image data representing an object may be sharpest when the object is positioned at the focus distance when the image data is detected. A point on an object may be focused by an asymmetric optical element to a corresponding point for capture in image data when the point on the object is positioned at the focus distance. Away from the focus distance (e.g., closer or farther away from the focus distance) a sharpness of the captured point may be decreased. At distances other than the focus distance, the point may be focused as a spot of increasing diameter in accordance with optical properties of the asymmetric optical element. Received light may converge to a point for capture by the camera when the object is positioned at the focus distance. At other distances, the received light from an object may not converge at an image plane (e.g., at a surface of an image sensor), thereby decreasing sharpness or focus of the object in captured image data. Detecting license plate information for objects not positioned at the focus distance may remain possible, though accuracy of such detection may decrease in accordance with lower fidelity image data.

In embodiments, a focus distance for a field location of a camera, as defined by an optical element of the camera, may be selected in accordance with a distance at which a predetermined object is expected to be positioned upon capture of image data. For example, objects comprising license plates may be positioned at different distances from a camera in accordance with a location at which the camera may be mounted. For a forward-facing camera mounted to a vehicle, a central region of a field of view of the camera may be aligned with a license plate disposed at first distance. For the same forward-facing camera, a lateral region of the field of view may be aligned with another license plate disposed at a second distance. The second distance may be less than the first distance. The second distance may be less than the first distance in accordance with a manner in which the vehicle on which the forward-facing camera moves (e.g., drives) relative to a first target vehicle and a second target vehicle on which the license plate and the other license plate are respectively mounted. By defining a focus distance of different regions or areas with these different distances, fidelity of the license plates captured at the different distances may be improved. In turn, higher fidelity image data (e.g., sharper, more focused, less blurry, etc.) may improve accuracy of a license plate recognition operation subsequently applied to the image data.

In embodiments, a focus area is associated with a range of distances at which ALPR system is able to capture useable image data and detect, from the image data, license plate information of target vehicles or objects of interest. ALPR system uses asymmetric lenses and/or image sensors comprising curvatures and/or tilts between image sensor and optics of camera apparatus to modify focus distances for focus areas of ALPR system to maximize likelihood of capturing license plate information. Specifically, a focus distance within a focus area may be further selected in accordance with a maximum ALPR distance of an ALPR system. In embodiments, a maximum ALPR distance may comprise a maximum field distance at which license plate information may be detected from image data in which an object is represented. The maximum field distance may correspond to one or more properties of the ALPR system. For example, image data of a license plate may require a minimum size in order for a license plate represented in the image data to be detected. The image data may be required to be a maximum number of pixels in height and/or a maximum number of pixels in width. License plate may have a standard, predetermined size. In accordance with this physical size, a license plate may be captured in different sizes of pixels in image data (numbers of pixels in image data, amounts of pixels in image data, etc.). As a field distance decreases, a size or amount of image data corresponding to a license plate may increase. Increasing sizes or amounts provide additional visual information for subsequent image processing, thereby increasing accuracy of license plate recognition operations. In embodiments, a maximum ALPR distance may comprise, for example, 100 feet. A first focus area may comprise a focus distance defined in accordance with the maximum ALRP distance. In embodiments, other focus areas of an asymmetric optical element may define focus areas that correspond to fractional distances of the maximum ALPR distance. For example, a second focus area may comprise a focus distance equal to three-quarters, half, or one fourth of the maximum ALPR distance. By defining a focus distance in accordance with a maximum ALPR distance of an ALPR system, detection of image data may be provided in accordance with physical properties of the ALPR system itself.

In embodiments, an ALPR system may comprise a minimum ALPR distance. The minimum ALPR distance may comprise a minimum field distance at which a license plate detected in image data. The minimum ALPR distance may comprise a minimum field distance at which the license plate may be provided in view of a manner in which the ALPR is mounted. For example, physical dimensions of a subject vehicle to which the ALPR system is mounted may establish a minimum field distance to which a license plate may approach the ALPR system. The minimum ALPR distance may alternately or additionally comprise field distance at which a license plate may be disposed before a portion of the license plate exits the field of view of the ALPR system.

As previously discussed, in various embodiments, first focus area 310 may correspond to a region of field of view of ALPR system in front of a camera apparatus. Because target vehicles in first focus area 310 may be in a same lane of traffic as subject vehicle, the target vehicles may be positioned at safe following distances relative to a subject vehicle to which the camera apparatus is mounted. Accordingly, focus distances with first focus area 310 may be defined to match such safe following distances. For example, a minimum focus distance within first focus area 310 may comprise 100 feet. Alternately or additionally, a maximum focus distance within first focus area 310 may comprise 200 feet. First focus area 310 may comprise a range of focus distances. For example, first focus area 310 (e.g., each field location within focus area 310) may comprise a focus distance of at least 100 feet, at least 150 feet, or between 100 feet and 200 feet. Accordingly, an asymmetric optical element of a camera of an ALPR system, such as lens 114 and/or image sensor 116 with brief reference to FIG. 1, may be configured to clearly focus on a license plate of a target vehicle disposed within first focus area 310 and within an expected range of minimum and maximum distances between the license plate and a camera of the ALPR system. In embodiments, the target vehicle may be positioned outside such distances and further captured in image data. However, outside of focus distances defined by the asymmetric optical element, image data open which the license plate information is subsequently identified may be less clear and, accordingly, accuracy of identified license plate information may be decreased in comparison with a license plate positioned within the focus distance in other captured image data.

In various embodiments, second focus area 315 may correspond to a region of field of view of an ALPR system adjacent to camera apparatus. In these regions of the field of view, target vehicles or other objects of interest are likely to be positioned in adjacent lanes of traffic to subject vehicle. Because subject and target vehicles may pass alongside, target vehicles appearing in second focus area 315 do not need to adhere to safe following distances as in first focus area 310. Target vehicles appearing in second focus area 315 may be disposed at decreased distances away the ALPR system. Accordingly, focus distances defined for field locations within second focus area 315 may be decreased relative to focus distances for field locations within first focus area 310 as well. For example, a minimum focus distance within second focus area 315 may comprise 50 feet. Alternately or additionally, a maximum focus distance within second focus area 315 may comprise 100 feet. Second focus area 315 may comprise a second range of focus distances. For example, second focus area 315 (e.g., each field location within second focus area 315) may comprise a focus distance of at least 50 feet, less than 100 feet, or between 50 feet and 100 feet. A range of focus distances of second focus area 315 may be less than a range of focus distances of first focus area 310. In some embodiments, a range of focus distances for one focus area may be half of a range of focus distances for another focus area. For example, a range of focus distances for first focus area 310 may be 100 feet, while a range of focus distances for second focus area 315 may be 50 feet. In embodiments, a minimum focus distance of second focus area 315 may comprise a field distance at which a license plate may be positioned prior to the license plate exiting a field of view of the ALPR system. Accordingly, an asymmetric optical element of a camera of an ALPR system may be configured to clearly focus on a license plate of a target vehicle disposed within second focus area 315 and within an expected range of minimum and maximum distances between the license plate and a camera of the ALPR system.

In embodiments, a width of a focus area may be approximately equal to a width of another focus area along a same direction from a center point. For example, a width of first focus area 310 from first point 340 in a horizontal direction along axis A may be the same as the width of second focus area 315 in the same direction. However, as discussed above, a range of focus distances associated with the second focus area 315 may be less than a range of focus distances of the first focus area 310.

In various embodiments, third focus area 320A, 320B may correspond to a region of field of view of ALPR system alongside subject vehicle, e.g., being adjacent at an intersection, in process of passing subject vehicle, or the like. Third focus area 320A, 320B may be aligned with physical locations adjacent to the subject vehicle in accordance with an orientation of camera of the ALPR system at which the camera is mounted to the subject vehicle. Target vehicles appearing in third focus area 320 are likely to be disposed at distances close to a subject vehicle. Accordingly, a focus distance for each field location of a camera within third focus area 320 may be defined to match such close distances. For example, a minimum focus distance within third focus area 320 may comprise 25 feet. Alternately or additionally, a maximum focus distance within third focus area 320 may comprise 50 feet. Third focus area 320 may comprise a third range of focus distances, different from a first range of focus distances associated with first focus area 310 and/or second focus area 315. For example, third focus area 320 (e.g., each field location within third focus area 320) may comprise a focus distance of at least 25 feet, less than 50 feet, or between 25 feet and 50 feet. In some embodiments, a range of focus distances for third focus area 320 may be less than a range of focus distances of second focus area 315. A range of focus distances of third focus area 320 may be half of a range of focus distances for second focus area 315. For example, the range of focus distances for third focus area 320 may be 25 feet. In some embodiments, a range focus distances for each of a sequence of focus areas in a same direction may be less than an adjacent, more centrally located focus area relative to a common first point (e.g, first point 340). The sequence of focus areas may comprise at least three focus areas as shown with respect to FIG. 3A-3B. As discussed elsewhere here, a location of each focus area within a field of view may be selected in accordance with a distance or range of distances at which an object to be captured in an image is expected to be located. In some embodiments, the distance or distances may be selected in accordance with different locations in an image at which license plates to be captured in an image are expected to be located upon use of an ALPR system. The ALPR system may be configured to capture each image in a forward-facing direction from a vehicle, wherein the ALPR system, or at least a camera of the ALPR system, is mounted in the vehicle.

In embodiments, a width of a focus area may be equal or less than a width of another focus area along a same direction from a center point. For example, a width of third focus area 320 from first point 340 in a horizontal direction along axis A may be less than the width of second focus area 315 in the same direction. In other embodiments, the width of third focus area 320 may be equal to the width of second focus area 315. However, in either of such embodiments, as discussed above, a range of focus distances associated with the third focus area 320 may be less than a range of focus distances of the second focus area 315.

In other embodiments, focus areas may correspond to different regions of field of view of ALPR system, and may be associated with different minimum and maximum focus distances based on a number of factors. For example, minimum and maximum focus distances may be impacted by local laws regarding safe following distances between subject and target vehicles, as well as layout of roadways or other expected environments of operation for ALPR system. Further, in other embodiments, ALPR system may comprise additional or different focus areas corresponding to different minimum and maximum focus distances based on, for example, expected distances between the ALPR system (e.g., a camera of the ALPR system) and target vehicles or other objects of interest appearing in the additional or different focus areas.

In embodiments, the focus distances illustrated in FIG. 3C may differ for different field locations. For example, focus distances along a different horizontal axis may have a lower maximum focus distance within one or more of the focus areas, 310, 315, 320 and/or exclude a focus region (e.g., first focus area 310 or first focus area 310 and second focus area 315) altogether. Different rates of change between distances within a focus area may alternately or additionally be employed as well. For example, a change between a maximum and minimum focus distance within a zone may change linearly, exponentially, or in a stepwise manner among various possible functions. Different focus areas may also employ different rates of change as well. For example, a first focus area may define an exponential rate of change over field locations between a maximum and minimum focus distance associated with the first focus area, while a second focus area may define a linear rate of change across field locations between a maximum and minimum focus distance associated with the first focus area. Other maximum and minimum distances may also be provided for a focus area in accordance with an expected field distance of license plate or other object of interest, including as further noted above.

Returning to FIG. 3A, focus areas comprising minimum and maximum focus distances based at least in part on expected field locations of target vehicles captured in the respective focus areas enable ALPR system to capture license plate information of one or more target vehicles at different field distances. For example, scene 300 comprises a first target vehicle 305A at a first field location and first field distance. First target vehicle 305A may correspond to second target vehicle 108B with brief reference to FIG. 1. Scene 300 also comprises a second target vehicle 305B at a second field location and second field distance. Second target vehicle 305B may correspond to first target vehicle 108A with brief reference to FIG. 1. The first field location is within first focus area 310. The second field location is within second focus area315. Accordingly, a license plate of first target vehicle 305A is located in first focus area 310. The license plate of first target vehicle 305A may be detected in image data in which first focus area 310 is captured. License plate information for the license plate of first target vehicle 305A may be identified from image data in which first focus area 310 is captured. A license plate of second target vehicle 305B is located in third focus area 320. The license plate of second target vehicle 305B may be detected in image data in which third focus area 320 is captured. License plate information for the license plate of second target vehicle 305B may be identified from image data in which third focus area 320 is captured. Because first focus area 310 and third focus area 320 comprise to different minimum and maximum focus distances, ALPR system is configured to accurately detect license plate of first target vehicle 305A in first focus area 310 and license plate of second target vehicle 305B in third focus area 320 despite first and second target vehicles being at different field distances from camera apparatus and potentially experiencing different lighting, weather, and other environmental conditions due to different field distances. In accordance with the one or more focus areas of an asymmetric optical element of the ALPR system, each of the first license plate of first target vehicle 305A and the second license plate of second target vehicle 305B may be detected in focus (e.g., a same degree of focus) in same image data captured via the asymmetric optical element.

FIG. 4A is an example illustration of a scene captured by a camera apparatus of an ALPR system, in accordance with various embodiments. As discussed in conjunction with FIG. 3A, in various embodiments, ALPR system as described in conjunction with FIG. 4A may be similar to, or have similar aspects and/or components with, any other ALPR system previously discussed, such as ALPR system 100 and/or ALPR system 200. In various embodiments, a camera apparatus of an ALPR system may be mounted in a subject vehicle, e.g., as described in conjunction with FIG. 1, such that ALPR system is likely to operate on roadways and other vehicle-accessible areas such as parking lots. Scene 400 may comprise one or more objects of interest to ALPR system captured by camera apparatus. For example, scene 400 may comprise one or more target vehicles 405A, 405B at varying field locations relative to camera apparatus. The one or more target vehicles 405A, 405B are associated with license plate information. Scene 400 may additionally comprise one or more additional objects or factors, such as landscape elements, weather elements, pedestrians, bicyclists, and the like. The camera, or camera apparatus, of the ALPR system may be mounted to the subject vehicle such that these objects may be located in predetermined locations within a field of view of the camera. The object may be further expected to be positioned at predetermined field distances relative to the camera and a focus distance at the predetermined location within the field of view may be provided accordingly.

Figure 4B:
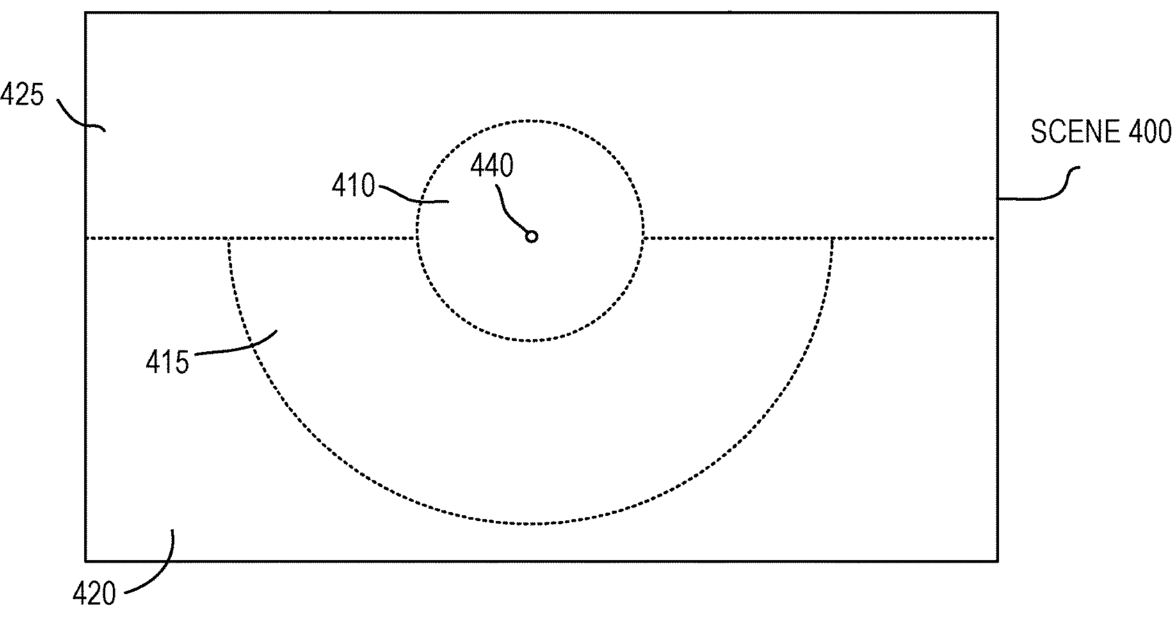
FIG. 4B is an example diagram of an asymmetric lens of a camera apparatus of an ALPR system, in accordance with various embodiments.

As discussed in conjunction with FIGS. 3A and 3B, an asymmetric optical element (e.g., asymmetric lens and/or asymmetric image sensor) of ALPR system comprises one or more curved portions configured to establish a predetermined focus distance. The curved portions corresponding to focus areas may be based at least in part on regions of a field of view of a camera apparatus. When mounted to a vehicle other support, the regions may be associated with expected locations at which an object of interest may be positioned. The focus areas may be aligned with the locations and a focus distance of the focus area may be defined in accordance with a predetermined field distance at which the object of interest is expected to be positioned. In the example of FIGS. 4A and 4B, asymmetric lens of ALPR system comprises four portions corresponding to four focus areas. FIGS. 4A and 4B illustrate focus areas 410, 415, 420, 425, wherein FIG. 4A illustrates focus areas overlaid on scene 400 and FIG. 4B illustrates focus areas independently of a scene.

In various embodiments, two or more focus areas may be concentric. For example, first focus area 410 is radially centered at a first point 440 or field location of an asymmetric optical element of the ALPR system. In accordance with a manner in which the asymmetric optical element is mounted, first point 440 may be aligned with a first point in scene 400. The first point in the scene may correspond to a position in scene 400 at which a first object may be expected to be disposed for capture in image data by the ALPR system. Second focus area 415 is also radially centered at first point 440 or field location of the asymmetric optical element and, accordingly, the first point in the scene. Third focus area 420 comprises field locations of the asymmetric optical element of the ALPR system, distinct from first focus area 410 and second focus area 415. These field locations of third focus area 420 may be below second focus area 415. These field locations of third focus area 420 may comprise all adjacent field locations beneath a horizontal threshold. Upon the ALPR system being mounted, these field locations may be aligned with ground around the ALPR system, below a horizon at which an earth's surface may be perceived to meet a sky in image data captured via the ALPR system. Fourth focus area 425 comprises field locations above the horizontal threshold and outside the second focus area 415. These field locations may be aligned with top portions of field of view of a camera of the ALPR system, distinct from first focus area 410, second focus area 415, and third focus area 420. these field locations may comprise all adjacent field locations of an asymmetric optical element above the horizontal threshold. In various embodiments as shown in FIGS. 4A and 4B, first point 440 is vertically asymmetric within the field locations of the asymmetric optical element. First point 440 may be being located (e.g., aligned) above center of a field of view of the camera of the ALPR system. In embodiment of FIGS. 4A and 4B, first point is horizontally symmetric within the field locations of the asymmetric optical element. First point 440 may be horizontally aligned with a center (e.g., relatively centered) in field of view of camera apparatus. In other embodiments, first point may be horizontally asymmetric in addition to or instead of being vertically asymmetric. For example, first point may be positioned right of a center of a field of view, thereby enabling a camera of an ALPR system to be angled to a left of a forward direction of a vehicle while still capturing objects positioned in the forward direction at predetermined focus distances. Such an arrangement may enable additional image data to be captured for physical regions on a left side of a subject vehicle or other object to which the ALPR system is mounted.

In various embodiments, asymmetric lens of camera apparatus of ALPR system comprises four curved portions, each curved portion of the four curved portions corresponding to focus areas 310, 315, 320, 325. In other embodiments, asymmetric lens of camera apparatus of ALPR system is tilted at an angle, the angle configured to modify at least one of third focus area 420 or fourth focus area 425. The lens may be tilted with respect to an image sensor. The lens may be tilted such that one end of the lens is closer to the image sensor than another end of the lens opposite the one end. For example, lens 114 comprising an asymmetric lens associated with focus areas of FIG. 3B or 4B may be tilted relative to image sensor 116 with brief reference to FIG. 1. For example, asymmetric lens of camera apparatus is tilted at an angle configured to create a minimum and maximum ALPR focus distance for third focus area 420 less than minimum and maximum ALPR focus distance for fourth focus area 425. In another example, asymmetric lens of camera apparatus is tilted at an angle configured to achieve a desired minimum and maximum ALPR focus distance for third focus area 420, e.g., of less than 50 ft. Because it is unlikely for objects of interest (e.g., target vehicles) to appear in fourth focus area 425 as illustrated in FIG. 4A, minimum and maximum ALPR focus distance for third focus area 420 may be prioritized above minimum and maximum ALPR focus distances for fourth focus area, e.g., such that asymmetric lens is tilted at an angle configured to de-emphasize fourth focus area.

In various embodiments, focus areas may be divided or oriented differently in field of view of camera apparatus. For example, focus areas may be divided horizontally, vertically, diagonally, or may comprise different relative sizes or portions of field of view than those illustrated in conjunction with FIGS. 3A-4B. Additionally, minimum and maximum ALPR focus distances associated with focus areas may be achieved through one or more asymmetric lenses and/or image sensors of camera apparatus, one or more lenses and/or image sensors tilted at respective angles, or the like. In other embodiments, ALPR system may comprise fewer or additional focus areas than those discussed herein.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus or system for performing the operations herein. Such an apparatus or system may be specially constructed for the required purpose, and/or it may comprise a general-purpose device selectively activated or reconfigured by a computer program stored in the apparatus or system. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

Examples of various exemplary embodiments embodying aspects of the invention are presented in the following example set. It will be appreciated that all the examples contained in this disclosure are given by way of explanation, and not of limitation.

What is claimed is:

1. A camera for an automatic license plate recognition ("ALPR") system comprising:

an aperture for receiving light from a field of view of the camera;

an asymmetric lens for focusing the light received by the aperture to provide focused light, wherein:

the asymmetric lens comprises a curvature;

the curvature configured to define two or more focus areas relative to the field of view;

a first focus area of the two or more focus areas is aligned with a central region of the field of view and comprises a first focus distance of two or more focus distances, the first focus distance extending from the camera to a first field location within the field of view; and a second focus area of the two or more focus areas is aligned with a lateral region of the field of view and comprises a second focus distance of the two or more focus distances, the second focus distance less than the first focus distance and extending from the camera to a second field location within the field of view different from the first field location; and an image sensor for detecting image data of the field of view in response to the focused light, wherein the two or more focus distances of the focused light are determined in accordance with the two or more focus areas and enable the image sensor to capture the image data from the first field location and the second field location via the focused light.

2. The camera of claim 1, wherein the two or more focus areas comprises a third focus area.

3. The camera of claim 1, wherein the two or more focus areas are divided radially from a first point of the field of view.

4. The camera of claim 1, wherein the central region of the field of view is radially centered at a first point of the field of view.

5. The camera of claim 4, wherein the first focus area comprises the first focus distance corresponding to a maximum ALPR distance of the camera.

6. The camera of claim 4, wherein the first focus area comprises the first focus distance being at least 100 ft.

7. The camera of claim 4, wherein the lateral region of the field of view is radially centered at the first point of the field of view and adjacent to the central region.

8. The camera of claim 7, wherein a third focus area of the field of view comprises portions of the field of view distinct from the first focus area and the second focus area.

9. The camera of claim 8, wherein the third focus area comprises a focus distance of less than 50 ft.

10. The camera of claim 1, wherein the camera is configured to communicate the image data of the field of view to one or more processors of the ALPR system, the one or more processors configured to detect one or more license plates in the image data.

11. The camera of claim 1, wherein the camera is configured to communicate the image data of the field of view to one or more processors of the ALPR system, the one or more processors configured to detect at least a first license plate in the first focus area in the image data and a second license plate in the second focus area in the image data.

12. An automatic license plate recognition ("ALPR") system comprising:

a camera comprising:

an aperture for receiving light from a field of view of the camera;

an asymmetric lens for focusing the light received by the aperture to provide focused light, wherein the asymmetric lens comprises:

a curvature, the curvature configured to define two or more focus areas relative to the field of view, wherein a first focus area of the two or more focus areas is aligned with a central region of the field of view and a second focus area of the two or more focus areas is aligned with a lateral region of the field of view; and an image sensor for detecting image data of the field of view in response to the focused light, wherein:

a first predetermined focus distance of the focused light is determined in accordance with the first focus area and extends from the asymmetric lens of the camera to a first field location within the field of view;

a second predetermined focus distance of the focused light is determined in accordance with the second focus area and extends from the asymmetric lens of the camera to a second field location different from the first field location within the field of view; and the asymmetric lens is disposed at a fixed position relative to the image sensor, the first predetermined focus distance extends to the first field location to capture a first object at the first field location and the second predetermined focus distance extends to the second field location to capture a second object at the second field location; and one or more processors configured to perform steps comprising:

receiving, from the camera, the image data of the field of view, the image data comprising one or more license plates associated with vehicles in the field of view;

detecting the one or more license plates in the image data; and identifying license plate information from the one or more detected license plates.

13. The ALPR system of claim 12, wherein the two or more focus areas relative to the field of view are divided radially from a first point of the field of view.

14. The ALPR system of claim 12, wherein the central region of the field of view is radially centered at a first point of the field of view.

15. The ALPR system of claim 14, wherein the first predetermined focus distance of the first focus area corresponds to a maximum ALPR distance of the camera.

16. The ALPR system of claim 14, wherein the first predetermined focus distance is at least 100 ft.

17. The ALPR system of claim 14, wherein the lateral region of the field of view is radially centered at the first point of the field of view and is adjacent to the central region.

18. The ALPR system of claim 17, wherein a third focus area of the field of view comprises portions of the field of view not encompassed by at least one of the first focus area or the second focus area.

19. The ALPR system of claim 18, wherein the third focus area is optimized at a distance of less than 50 feet.

20. The ALPR system of claim 12, wherein:

the first predetermined focus distance and the first field location are determined based at least on a first expected position of the first object within the central region relative to a vehicle the camera is mounted on; and the second predetermined focus distance and the second field location are determined based at least on a second expected position of the second object within the lateral region relative to the vehicle the camera is mounted on, the second expected position being disposed between the first expected position and the vehicle within the second focus area of the lateral region.

* * * * *